US011982738B2

(12) United States Patent
Torres

(10) Patent No.: US 11,982,738 B2
(45) Date of Patent: May 14, 2024

(54) METHODS AND SYSTEMS FOR DETERMINING POSITION AND ORIENTATION OF A DEVICE USING ACOUSTIC BEACONS

(71) Applicant: Bose Corporation, Framingham, MA (US)

(72) Inventor: Wade P. Torres, Attleboro, MA (US)

(73) Assignee: Bose Corporation, Framingham, MA (US)

( * ) Notice: Subject to any disclaimer, the term of this patent is extended or adjusted under 35 U.S.C. 154(b) by 703 days.

(21) Appl. No.: 17/022,784

(22) Filed: Sep. 16, 2020

(65) Prior Publication Data

US 2022/0082688 A1    Mar. 17, 2022

(51) Int. Cl.
*G01S 15/08* (2006.01)
*G01C 19/00* (2013.01)
(Continued)

(52) U.S. Cl.
CPC .............. *G01S 15/08* (2013.01); *G01C 19/00* (2013.01); *G01P 15/08* (2013.01); *G01P 15/18* (2013.01); *H04R 1/02* (2013.01)

(58) Field of Classification Search
CPC ........ G01S 15/08; G01S 2205/01; G01S 5/30; G01S 11/14; G01S 5/186; G01C 19/00;
(Continued)

(56) References Cited

U.S. PATENT DOCUMENTS 6,446,002 B1    9/2002  Barton
7,305,097 B2   12/2007  Rosen et al.
(Continued)

FOREIGN PATENT DOCUMENTS

CN          115735363 A  *  3/2023  .............. G06F 3/011
WO     WO-2013061268 A2  *  5/2013  .............. G01S 1/80
(Continued)

OTHER PUBLICATIONS

Vera Erbes et al: "Extending the closed-form image source model for source directivity (Digital appendix)", Proceedings DAGA 2018 Munich, Mar. 22, 2018 (Mar. 22, 2018), pp. 1298-1301, XP055685529, doi: 10.14279/depositonce-6724.
(Continued)

*Primary Examiner* — Daniel Pihulic
(74) *Attorney, Agent, or Firm* — Bond, Schoeneck & King, PLLC

(57) ABSTRACT

A system and method for determining the position and orientation of a wearable audio device, for example, methods and systems for determining the position, orientation, and/or height of a wearable audio device using acoustic beacons. In some examples, the determined position, orientation, and/or height can be utilized to correct for drift experienced by an inertial measurement unit (IMU). In other examples, the drift may cause am externalized or virtualize audio source, generated within a known environment, to move or drift relative to the known locations of physical audio sources within the environment. Thus, the systems and methods described herein can be utilized to correct for drift in the position of a virtual audio source with respect to the wearable audio device by first determining its own absolute position and orientation within the environment.

14 Claims, 10 Drawing Sheets

(51) Int. Cl.
*G01P 15/08* (2006.01)
*G01P 15/18* (2013.01)
*H04R 1/02* (2006.01)

(58) Field of Classification Search
CPC ....... G01C 21/165; G01P 15/08; G01P 15/18; H04R 1/02; H04R 1/406; H04R 5/033; H04R 2201/023; H04R 2430/21; H04R 3/005; H04S 2400/11; H04S 2420/01; H04S 7/304
See application file for complete search history.

(56) References Cited

U.S. PATENT DOCUMENTS

| | | | |
|---|---|---|---|
| 7,630,500 | B1 | 12/2009 | Beckman et al. |
| 8,325,936 | B2 | 12/2012 | Eichfeld et al. |
| 9,066,191 | B2 | 6/2015 | Strauss et al. |
| 9,075,127 | B2 | 7/2015 | Hess et al. |
| 9,215,545 | B2 | 12/2015 | Dublin et al. |
| 9,352,701 | B2 | 5/2016 | Vautin et al. |
| 9,445,197 | B2 | 9/2016 | Oswald et al. |
| 9,571,925 | B1 * | 2/2017 | Adva Fish ............. H04R 3/005 |
| 9,674,630 | B2 | 6/2017 | Mateos Sole et al. |
| 9,706,327 | B2 | 7/2017 | Brannmark et al. |
| 9,743,187 | B2 | 8/2017 | Bender |
| 9,913,065 | B2 | 3/2018 | Vautin et al. |
| 9,955,261 | B2 | 4/2018 | Ojala et al. |
| 10,056,068 | B2 | 8/2018 | Oswald et al. |
| 10,057,679 | B2 * | 8/2018 | Fish ........................ H04R 3/005 |
| 10,123,145 | B2 | 11/2018 | Vautin et al. |
| 10,694,286 | B2 * | 6/2020 | Fish ........................ H04R 1/406 |
| 10,694,313 | B2 | 6/2020 | Zilberman et al. |
| 10,721,521 | B1 | 7/2020 | Robinson et al. |
| 10,812,926 | B2 | 10/2020 | Asada et al. |
| 11,202,137 | B1 * | 12/2021 | Kemmerer .......... H04R 1/1016 |
| 2008/0101589 | A1 | 5/2008 | Horowitz et al. |
| 2008/0170730 | A1 | 7/2008 | Azizi et al. |
| 2008/0273708 | A1 | 11/2008 | Sandgren et al. |
| 2008/0273722 | A1 | 11/2008 | Aylward et al. |
| 2008/0273724 | A1 | 11/2008 | Hartung et al. |
| 2008/0304677 | A1 | 12/2008 | Abolfathi et al. |
| 2009/0046864 | A1 | 2/2009 | Mahabub et al. |
| 2009/0214045 | A1 | 8/2009 | Fukui et al. |
| 2010/0226499 | A1 | 9/2010 | De Bruijn et al. |
| 2012/0008806 | A1 | 1/2012 | Hess |
| 2012/0070005 | A1 | 3/2012 | Inou et al. |
| 2012/0093320 | A1 | 4/2012 | Flaks et al. |
| 2012/0140945 | A1 | 6/2012 | Harris |
| 2013/0041648 | A1 | 2/2013 | Osman |
| 2013/0121515 | A1 | 5/2013 | Hooley et al. |
| 2013/0194164 | A1 | 8/2013 | Sugden et al. |
| 2014/0153751 | A1 | 6/2014 | Wells |
| 2014/0198918 | A1 | 7/2014 | Li et al. |
| 2014/0314256 | A1 | 10/2014 | Fincham et al. |
| 2014/0334637 | A1 | 11/2014 | Oswald et al. |
| 2015/0092965 | A1 | 4/2015 | Umminger et al. |
| 2015/0119130 | A1 | 4/2015 | Lovitt |
| 2015/0208166 | A1 | 7/2015 | Raghuvanshi et al. |
| 2016/0100250 | A1 | 4/2016 | Baskin et al. |
| 2016/0140949 | A1 * | 5/2016 | Fan ................... G10L 21/0208 381/71.11 |
| 2016/0286316 | A1 | 9/2016 | Bleacher et al. |
| 2016/0360224 | A1 | 12/2016 | Laroche et al. |
| 2016/0360334 | A1 | 12/2016 | Wu et al. |
| 2017/0078820 | A1 | 3/2017 | Brandenburg et al. |
| 2017/0085990 | A1 | 3/2017 | Sladeczek et al. |
| 2017/0230749 | A1 * | 8/2017 | Fish ........................ H04R 1/406 |
| 2018/0020312 | A1 | 1/2018 | Visser et al. |
| 2018/0077514 | A1 | 3/2018 | Lee et al. |
| 2018/0091922 | A1 | 3/2018 | Satongar |
| 2018/0124513 | A1 | 5/2018 | Kim et al. |
| 2018/0146290 | A1 | 5/2018 | Christoph et al. |
| 2018/0232471 | A1 | 8/2018 | Schissler et al. |
| 2019/0037334 | A1 | 1/2019 | Acharya |
| 2019/0058943 | A1 * | 2/2019 | Fish ........................ H04R 1/406 |
| 2019/0104363 | A1 | 4/2019 | Vautin et al. |
| 2019/0187244 | A1 | 6/2019 | Riccardi et al. |
| 2019/0313201 | A1 | 10/2019 | Torres et al. |
| 2019/0357000 | A1 | 11/2019 | Karkkainen et al. |
| 2020/0037097 | A1 | 1/2020 | Torres et al. |
| 2020/0107147 | A1 | 4/2020 | Munoz et al. |
| 2020/0275207 | A1 | 8/2020 | Zilberman et al. |
| 2020/0413213 | A1 | 12/2020 | Konagai |
| 2021/0400417 | A1 | 12/2021 | Freeman et al. |
| 2022/0082688 | A1 * | 3/2022 | Torres .................... H04R 3/005 |

FOREIGN PATENT DOCUMENTS

| | | | | |
|---|---|---|---|---|
| WO | | 2018127901 | A1 | 7/2018 |
| WO | | 2020035335 | A1 | 2/2020 |
| WO | WO-2021258102 | A1 * | 12/2021 | ............. H04S 7/304 |
| WO | WO-2022061342 | A2 * | 3/2022 | ............. G01C 19/00 |

OTHER PUBLICATIONS

International Search Report and the Written Opinion of the International Searching Authority, International Patent Application No. PCT/US2020/053068, pp. 1-15, dated Dec. 4, 2020.
International Search Report and the Written Opinion of the International Searching Authority, International Application No. PCT/US2019/024618, pp. 1-15, dated Jun. 19, 2019.
Jot et al.; Augmented Reality Headphone Environment Rendering; Audio Engineering Society Conference Paper; 2016; pp. 1-6.
International Search Report and the Written Opinion of the International Searching Authority, International Patent Application No. PCT/US2021/070709, pp. 1-11, dated Oct. 5, 2021.
International Search Report and the Written Opinion of the International Searching Authority, International Patent Application No. PCT/US2019/024618, pp. 1-15, dated Jun. 19, 2019.
International Search Report and the Written Opinion of the International Searching Authority, International Patent Application No. PCT/US2021/0071464, pp. 1-19, dated Feb. 24, 2022.
The International Search Report and the Written Opinion of the International Searching Authority, International Patent Application No. PCT/US2021/072012, pp. 1-14, dated Feb. 11, 2022.
The International Search Report and the Written Opinion of the International Searching Authority, International Patent Application No. PCT/US2021/072072, pp. 1-13, dated Mar. 10, 2022.
"Omnidirectional.", Sweetwater, Nov. 3, 1997, www.sweetwater.com/insync/omnidirectional/#:-:text=Speakers%20are%20omnidirectional%20if%20they,beam%E2%80%9D%20or%20be%20very%20directional. (Year: 1997).
International Preliminary Report on Patentability, International Patent Application No. PCT/US2021/0071464, pp. 1-13, dated Mar. 30, 2023.
International Preliminary Report on Patentability, International Patent Application No. PCT/US2020/053068, pp. 1-11, dated Apr. 5, 2022.
International Preliminary Report on Patentability, International Patent Application No. PCT/US2020/070709, pp. 1-7, dated Dec. 13, 2022.

* cited by examiner

METHODS AND SYSTEMS FOR DETERMINING POSITION AND ORIENTATION OF A DEVICE USING ACOUSTIC BEACONS

BACKGROUND

Aspects and implementations of the present disclosure relate to audio systems, specifically, to audio systems which include one or more wearable device and one or more audio source. Some wearable devices, such as headphones or smart glasses, may utilize a collection of sensors, referred to as an inertial measurement unit (IMU) to derive relative position and/or orientation of the device with respect to a fixed point in space. Accumulation of small measurement errors within the IMU, for example due to noise and/or offsets, compound over time, resulting in larger and larger errors in the perceived orientation and perceived position of the device with respect to its actual position in space.

SUMMARY OF THE DISCLOSURE

The present disclosure relates to systems and methods for determining the position and orientation of a wearable audio device, for example, methods and systems for determining the position and orientation of a wearable audio device using acoustic beacons. In some examples, the determined position and orientation can be utilized to correct for drift experienced by an inertial measurement unit (IMU). In other examples, the drift may cause an externalized or virtualize audio source, generated within a known environment, to move or drift relative to the known locations of physical audio sources within the environment. Thus, the systems and methods described herein can be utilized to correct for drift in the position of a virtual audio source with respect to the wearable audio device by first determining its own absolute position and orientation within the environment.

Acoustic augmented reality experiences typically require some form of localization data of the surrounding environment, for example, to obtain the locations of acoustically reflective surfaces within the environment. The IMU in many wearable audio devices can sense the angular velocity and/or the linear acceleration of a user wearing the device using a three-axis accelerometer and a three-axis gyroscope. In theory, these sensors can be used to track position and orientation of the device in space. However, because the sensors have noise and other offsets, the integration drifts and the estimates of the position and orientation quickly become incorrect. Thus, the present disclosure is directed to using one or more microphones on the device and the knowledge of the signals sent to physical speakers within the environment to determine how far away the device is from each source speaker. Said another way, the system can include a plurality of audio source devices at known locations. Once these source devices produce sound, it is possible to correct for any drift experienced by the IMU. Because sound travels at a known velocity through air, the system utilizes time-of-flight information obtained by comparing a reference signal with the actual signals obtained by microphones on the wearable audio device to determine the distances between each microphones and each source device. With enough sources the wearable audio device can triangulate its own location relative to the audio source devices and obtain a complete description of the position and orientation of the device, including, for example, position in the cartesian x, y, and z planes as well as yaw, pitch, and roll.

In one example, a wearable audio device is provided, the wearable audio device including a first microphone and a second microphone, the first microphone and the second microphone configured to obtain a first signal representative of a first sound rendered in an environment by a first audio source, and a processor configured to derive an orientation of the wearable audio device relative to the first audio source within the environment based at least in part on the first signal received at the first microphone and the second microphone.

In one aspect, the wearable device further includes an inertial measurement unit wherein the processor is further configured to determine a perceived orientation of the wearable audio device based at least in part on the inertial measurement unit.

In one aspect, the processor is configured to generate a first virtual audio source within the environment and wherein the processor is configured to prevent or correct a drift in a virtual position of the first virtual audio source relative to the first audio source, the drift created by the perceived orientation of the wearable audio device relative to the first audio source.

In one aspect, the processor is configured to determine a first distance between the first audio source and the first microphone and a second distance between the first audio source and the second microphone based on time-of-flight information and derive the orientation of the wearable audio device relative to the first audio source based at least in part on the time-of-flight information.

In one aspect, the first microphone and the second microphone are configured to obtain a second signal representative of a second sound rendered within the environment by a second audio source, and wherein the processor is further configured to derive a position of the wearable audio device relative to the first audio source and the second audio source.

In one aspect, the first microphone and the second microphone are configured to obtain a third signal representative of a third sound rendered within the environment by a third audio source, and wherein the processor is further configured to derive a height of the wearable audio device relative to the first audio source, the second audio source, and/or the third audio source based at least in part on the first signal, the second signal and/or the third signal.

In one aspect, the processor is configured to utilized a gradient descent algorithm or a gradient ascent algorithm which utilizes time-of-flight information from the first signal, a second signal generated by a second audio source, and/or a third signal generated by a third audio source, received at the first microphone and the second microphone, to determine the orientation and a position of the wearable audio device.

In another example, a wearable audio device is provided, the wearable audio device including a first microphone configured to obtain a first signal representative of a first sound rendered within an environment by a first audio source, and a second signal representative of a second sound rendered within the environment by a second audio source, and a processor configured to derive a position of the wearable audio device relative to the first audio source and the second audio source based at least in part on the first signal and the second signal.

In one aspect, the wearable audio device further includes an inertial measurement unit wherein the processor is further configured to determine a perceived orientation of the wearable audio device based at least in part on the inertial measurement unit.

In one aspect, the processor is configured to generate a first virtual audio source within the environment and wherein the processor is configured to prevent or correct a drift in a virtual position of the first virtual audio source relative to the first audio source and the second audio source, the drift created by the perceived orientation of the wearable audio device relative to the first audio source and the second audio source.

In one aspect, the processor is configured to determine a first distance between the first audio source and the first microphone and a second distance between the second audio source and the first microphone based on time-of-flight information and derive the position of the wearable audio device relative to the first audio source and the second audio source based at least in part on the time-of-flight information.

In one aspect, the wearable audio device comprises a second microphone, the second microphone configured to obtain the first signal and the second signal within the environment, and the processor is further configured to derive an orientation of the wearable audio device relative to the first audio source and the second audio source based at least in part on the first signal and the second signal.

In one aspect, the first microphone and the second microphone are configured to obtain a third signal representative of a third sound rendered within the environment by a third audio source, and wherein the processor is further configured to derive a height of the wearable audio device relative to the first audio source, the second audio source, and/or the third audio source based at least in part on the first signal, the second signal and/or the third signal.

In one aspect, the processor is configured to utilized a gradient descent algorithm or a gradient ascent algorithm which utilizes time-of-flight information from the first signal, a second signal generated by a second audio source, and/or the third signal generated by the third audio source, received at the first microphone and the second microphone, to determine the orientation and the position of the wearable audio device based at least in part on the first signal, the second signal, and/or the third signal.

In another example, a method of determining an orientation of a wearable audio device is provided, the method including: obtaining, via a first microphone and a second microphone of a wearable audio device, a first signal representative of a first sound rendered in an environment by a first audio source; deriving, via a processor, the orientation of the wearable audio device relative to the first audio source within the environment based on the first signal received at the first microphone and the second microphone.

In one aspect, the wearable audio device includes an inertial measurement unit and the method further includes: determining, via the processor, a perceived orientation of the wearable audio device based at least in part on the inertial measurement unit.

In one aspect, the method further includes: generating, via the processor, a first virtual audio source within the environment; and preventing or correcting, via the processor, a drift in a virtual position of the first virtual audio source relative to the first audio source, the drift created by the perceived orientation of the wearable audio device relative to the first audio source.

In one aspect, the method further includes: determining, via the processor, a first distance between the first audio source and the first microphone and a second distance between the first audio source and the second microphone based on time-of-flight information; and deriving the orientation of the wearable audio device relative to the first audio source based at least in part on the time-of-flight information.

In one aspect, the method further includes: obtaining, via the first microphone and the second microphone, a second signal representative of a second sound rendered within the environment by a second audio source; and deriving, via the processor, a position of the wearable audio device relative to the first audio source and the second audio source based at least in part on the first signal and/or the second signal.

In one aspect, the method further includes: obtaining, via the first microphone and the second microphone, a third signal representative of a third sound rendered within the environment by a third audio source; and deriving, via the processor, a height of the wearable audio device relative to the first audio source, the second audio source, and/or the third audio source based at least in part on the first signal, the second signal and/or the third signal.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to systems and methods for determining the position and orientation of a wearable audio device, for example, methods and systems for determining the position and orientation of a wearable audio device using acoustic beacons. In some examples, the determined position and orientation can be utilized to correct for drift experienced by an inertial measurement unit (IMU). In other examples, the drift may cause an externalized or virtualize audio source, generated within a known environment, to move or drift relative to the known locations of physical audio sources within the environment. Thus, the systems and methods described herein can be utilized to correct for drift in the position of a virtual audio source with respect to the wearable audio device by first determining its own absolute position and orientation within the environment.

Figure 1:
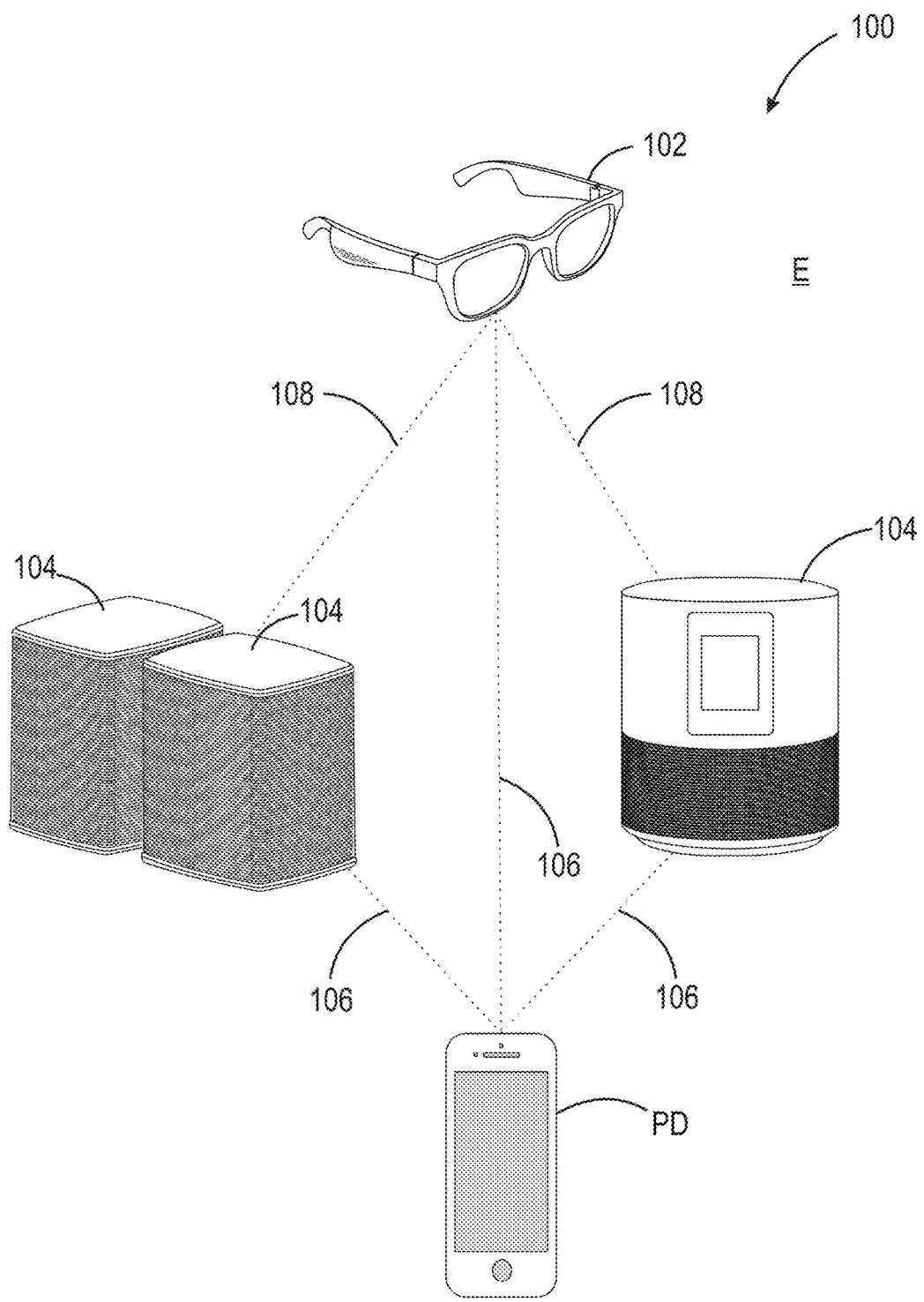
FIG. 1 is a schematic view of a system according to the present disclosure.

The term "wearable audio device", as used in this application, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of acoustic drivers, it should be appreciated that a wearable audio device can be a single stand-alone unit having only one acoustic driver. Each acoustic driver of the wearable audio device can be connected mechanically to another acoustic driver, for example by a headband and/or by leads that conduct audio signals to the pair of acoustic drivers. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows an example of an audio eyeglasses form factor, in other examples the headset may be an in-ear, on-ear, around-ear, or near-ear headset. In some examples, a wearable audio device may be an open-ear device that includes an acoustic driver to radiate acoustic energy towards the ear while leaving the ear open to its environment and surroundings.

The term "head related transfer function" or acronym "HRTF" as used herein, in addition to its ordinary meaning to those with skill in the art, is intended to broadly reflect any manner of calculating, determining, or approximating the binaural sound that a human ear perceives such that the listener can approximate the sound's position of origin in space. For example, a HRTF may be a mathematical formula or collection of mathematical formulas that can be applied or convolved with an audio signal such that a user listening to the modified audio signal can perceive the sound as originating at a particular point in space. These HRTFs, as referred to herein, may be generated specific to each user, e.g., taking into account that user's unique physiology (e.g., size and shape of the head, ears, nasal cavity, oral cavity, etc.). Alternatively, it should be appreciated that a generalized HRTF may be generated that is applied to all users, or a plurality of generalized HRTFs may be generated that are applied to subsets of users (e.g., based on certain physiological characteristics that are at least loosely indicative of that user's unique head related transfer function, such as age, gender, head size, ear size, or other parameters). In one example, certain aspects of the HRTFs may be accurately determined, while other aspects are roughly approximated (e.g., accurately determines the inter-aural delays, but coarsely determines the magnitude response).

The following description should be read in view of FIGS. 1-7. FIG. 1 is a schematic view of system 100 employed in an environment E according to the present disclosure. System 100 includes at least one wearable audio device, e.g., wearable audio device 102, and a plurality of audio sources 104A-104C (collectively referred to as "audio sources 104" or "plurality of audio sources 104" or "audio source devices 104"). Wearable audio device 102 is intended to be a device capable of obtaining (via microphones discussed below) sounds within environment E, e.g., sounds 108A-108C (collectively referred to as "sounds 108" or "plurality of sounds 108")(shown in FIGS. 3-6), and converting those sounds into a plurality of signals, e.g., signals 150A-150F (shown in FIGS. 2A and 2B). Additionally, wearable audio device 102 can include one or more speakers, e.g., first speaker 122 and second speaker 124 (shown in FIGS. 4-7 and discussed below) to provide an audio playback to a user or wearer of the wearable audio device 102. In one example, as illustrated in FIG. 1, wearable audio device 102 is an eyeglass form factor open-ear audio device capable of rendering acoustic energy outside of and proximate to a user's ear. It should be appreciated that, in other examples, wearable audio device 102 can be selected from over-ear or in-ear headphones, earphones, earpieces, a headset, earbuds, or sport headphones. In some examples, system 100 includes at least one peripheral device PD that can be selected from any electronic device capable of generating and/or transmitting an audio signal, e.g., reference signal 106 discussed below, to a separate device, e.g., wearable audio device 102 and/or audio sources 104. In one example, as illustrated in FIG. 1, the peripheral device PD is intended to be a smart phone or tablet. However, it should be appreciated that the peripheral device PD can be selected from a smart phone, a tablet, a laptop or personal computer, a case configured to matingly engage with and/or charge the wearable audio device 102, or any other portable and/or movable computational device.

Each audio source device of plurality of audio source devices 104 is intended to be a device capable of receiving an audio signal, e.g., reference signal 106, related to an audio, video, or other stored media or media stream to be rendered by the audio source devices 104 into audible sound. As will be discussed below, each audio source 104 can include one or more acoustic drivers, transducers, or loudspeakers, e.g., source speaker 144 (discussed below), capable of receiving reference signal 106 and producing at least one of a plurality of sounds within the environment E, e.g., plurality of sounds 108A-108C (shown in FIGS. 3-7). In at least some examples, audio sources 104 are indented to be loudspeakers, e.g., wired or wireless loudspeakers; however it should be appreciated that each audio source 104 can be selected from: a portable speaker, a smart phone, a tablet, a personal computer, a smart television, a far-field audio device, vehicle speakers or any other device capable of generating a detectable sound within environment E in response to reference signal 106. In another example, at least one audio source 104 can take the form of a Public Address (PA) system or other speaker system within a public place such as an arena, gymnasium, or concert venue. It should be appreciated that each audio source 104 can receive reference signal 106 and utilize reference signal 106 to generate a respective sound at each audio source 104 within the environment E, e.g., plurality of sounds 108A-108C, respectively. Although only three audio sources 104A-104C are illustrated and described herein, it should be appreciated that more than three audio sources 104 may be utilized, e.g., four, five, six, eight, ten, etc.

Figure 2A:
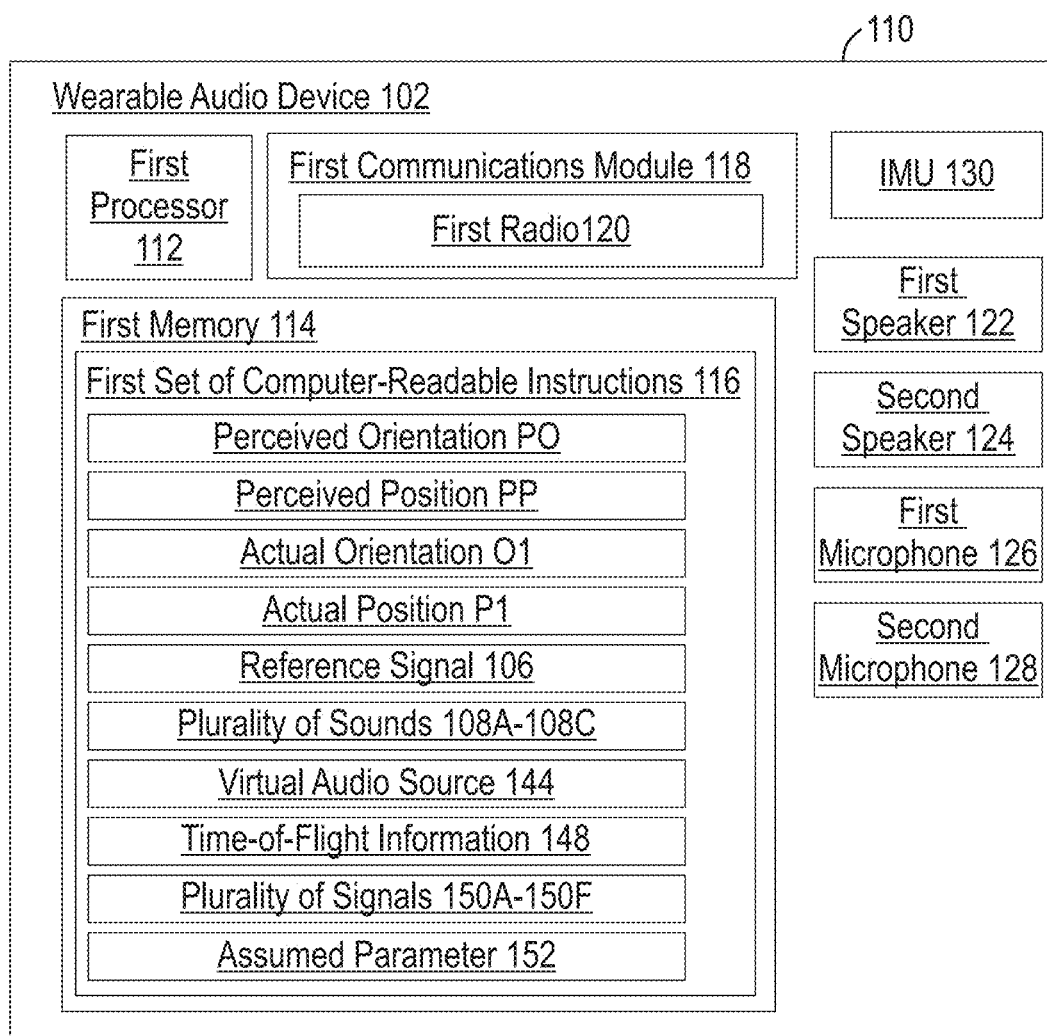
FIG. 2A is a schematic representation of the components of a wearable audio device according to the present disclosure.

As illustrated in FIG. 2A, wearable audio device 102 can further include first circuitry 110 including a first processor 112 and first memory 114 capable of executing and storing, respectively, a first set of non-transitory computer-readable instructions 116 to perform the functions of wearable audio device 102 as described herein. First circuitry 110 can also include a first communications module 118 configured to send and/or receive wireless data, e.g., data relating to the reference signal 106 from peripheral device PD (as illustrated in FIG. 1). It should also be appreciated that wearable audio device 102 can also be configured to send wireless data, e.g., reference signal 106 to each audio source device 104. To that end, first communications module 118 can include at least one radio or antenna, e.g., a first radio 120 capable of sending and receiving wireless data. In some examples, first communications module 118 can include, in addition to at least one radio (e.g., first radio 120), some form of automated gain control (AGC), a modulator and/or demodulator, and potentially a discrete processor for bit-processing that are electrically connected to first processor 112 and first memory 114 to aid in sending and/or receiving wireless data. As will be discussed below, first circuitry 110 of wearable audio device 102 can also include a first speaker 122 and a second speaker 124, e.g., a loudspeaker or acoustic driver or transducer, that is electrically connected to first processor 112 and first memory 114 and configured to electromechanically convert an electrical signal, e.g., reference signal 106, into audible acoustic energy within environment E, also referred to herein as an audio playback. In some examples, the reference signal 106 and the audible acoustic energy are associated with the data sent and received between wearable audio device 102, the plurality of audio source devices 104 and/or the peripheral device PD. In one example, as illustrated in FIGS. 4-7, first speaker 122 is intended to be a speaker positioned proximate to the user's right ear while second speaker 124 is intended to be a speaker positioned proximate to the user's left ear.

Additionally, as will be discussed below, first circuitry 110 of wearable audio device 102 can further include at least one microphone. In some examples, wearable audio device 102 has only one microphone, i.e., first microphone 126. In other examples, wearable audio device 102 comprises a plurality of microphones, i.e., at least first microphone 126 and second microphone 128. It should be appreciated that, although the examples that follow describe wearable audio device 102 having one or two microphones, i.e., first microphone 126 and/or second microphone 128, in some examples, more than two microphones may be utilized for example, three, four, six, eight, etc. As will be discussed below, each microphone is capable of receiving the sounds within the environment E and converting, generating, or obtaining a signal associated with that respective sound, e.g., sounds 108A-108C generated by the speakers (discussed below) of each audio source device 104. Additionally, in the examples discussed below and illustrated with respect to FIGS. 4-7, two microphones, e.g., first microphone 126 and second microphone 128, can be utilized. In these examples, first microphone 126 can engage with, secure to, or mount on or within the right side of wearable audio device 102 proximate the user's right ear and second microphone can engage with, secure to, or mount on or within the left side of wearable audio device 102 proximate the user's left ear.

Additionally, first circuitry 110 of first wearable audio device 102 can further include an inertial measurement unit 130 (shown schematically in FIG. 2A). Inertial measurement unit (IMU) 130 is intended to include one or more sensors configured to obtain a perceived orientation PO of the wearable audio device 102 relative to one or more audio sources 104, and/or a perceived position PP of the wearable audio device 102 relative to one or more audio sources 104 relative to the one or more audio sources 104 (all shown in FIG. 3 and discussed below). In some examples, the sensors of IMU 130 can be selected from one or more of: a gyroscope (e.g., a three-axis gyroscope), an accelerometer (e.g., a three-axis accelerometer), a magnetometer, a camera, a proximity sensor, a light detection and ranging sensor (LIDAR), an ultrasonic distance sensor, or any other sensor capable of obtaining relative distance, orientation, position, or height information of the wearable audio device 102 relative to one or more audio source devices 104 and/or other objects with known locations within or proximate to environment E. In some examples, IMU 130 can also include one or more sensors for deriving or obtaining information related to the absolute position, e.g., a global positioning system sensor (GPS) capable of obtaining at least position information of wearable audio device 102. As will be discussed below, IMU 130 can employ one or more algorithms to process the data obtained from the foregoing sensors to determine the relative perceived position and orientation of wearable audio device 102 relative to one or more audio source devices 104. It should be appreciated that the determination of relative perceived position of wearable audio device 102 relative to one or more audio source devices 104 can include a determination of relative perceived height of the wearable audio device 102 relative to the actual height of one or more audio source devices 104.

Figure 2B:
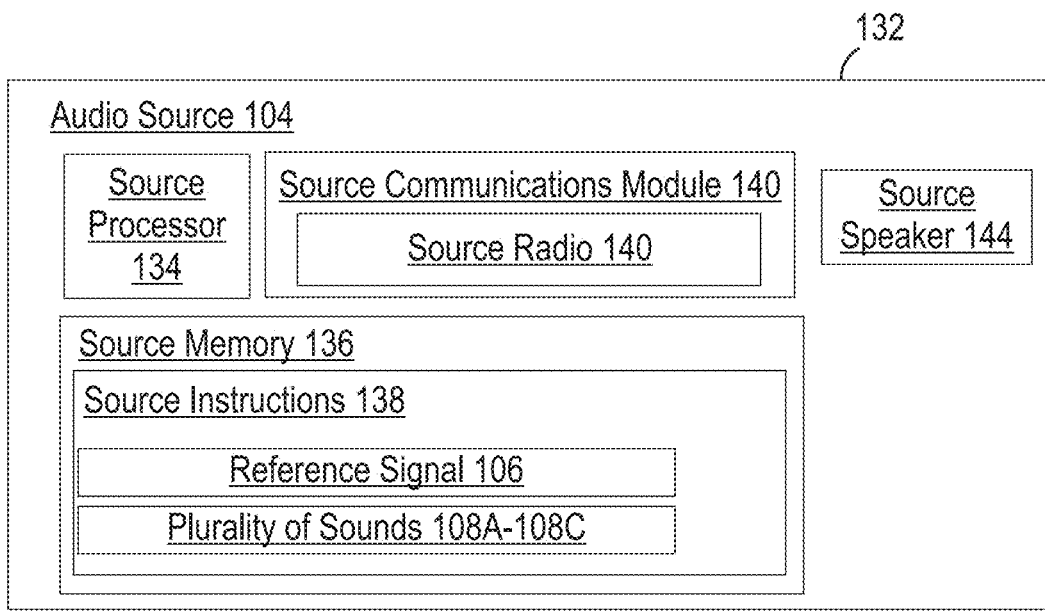
FIG. 2B is a schematic representation of the components of an audio source device according the present disclosure.

As illustrated in FIG. 2B, each audio source device can also include its own circuitry, i.e., source circuitry 132. Each source circuitry 132 of each audio source device 104 includes a source processor 134 and source memory 136 capable of executing and storing, respectively, a set of non-transitory computer-readable instructions, i.e., source instructions 138, to perform the functions of each respective audio source device 104 as described herein. Each source circuitry 132 can also include a source communications module 140 configured to send and/or receive wireless data, e.g., data relating to the reference signal 106 to and/or from, e.g., peripheral device PD or wearable audio device 102. To that end, each source communications module 140 can include at least one radio or antenna, e.g., a source radio 142, capable of sending and receiving wireless data. In some examples, each source communications module 140 can include, in addition to at least one radio (e.g., source radio 142), some form of automated gain control (AGC), a modulator and/or demodulator, and potentially a discrete processor for bit-processing that are electrically connected to each respective source processor 134 and source memory 136 to aid in sending and/or receiving wireless data. As will be discussed below, each audio source device 104, and therefore each source circuitry 132 can also include at least one source speaker 144, e.g., a loudspeaker or acoustic driver or transducer, that is electrically connected to its respective source processor 134 and source memory 136 and configured to electromechanically convert an electrical signal, e.g., reference signal 106, into audible acoustic energy within environment E, also referred to herein as audio playback. In some examples, the reference signal 106 and the audible acoustic energy are associated with the data sent and received between wearable audio device 102, the plurality of audio source device 104 and/or the peripheral device PD.

In some examples, system 100 can be configured to generate, create, or otherwise render one or more virtual audio sources within environment E. For example, wearable audio device 102 and/or peripheral device PD can be configured to modify reference signal 106 into one or more modified audio signals that have been filtered or modified using at least one head-related transfer function (HRTF). In one example of system 100, the system can utilize this virtualization or externalization with augmented reality audio systems and programs by modeling the environment E (e.g., using a localizer or other source of environment data), creating virtual sound sources at various positions within environment E, e.g., virtual sound source 146, and modeling or simulating sound waves and their respective paths from the virtual sound source 146 (shown in FIGS. 3-6) to the position of the wearable audio device 102 and/or the position of the user's ears while wearing wearable audio device 102 to simulate to the user perception of sound as though the virtual sound source 146 was a real or tangible sound source, e.g., a physical speaker located at the position of virtual sound source 146 within environment E. For each modeled or simulated sound path (e.g., direct sound paths or reflected sound paths), computational processing is used to apply or convolve at least one pair of HRTFs (one associated with the left ear and one associated with the right ear) to the reference signal 106 to generate modified audio signals. Once the HRTFs have been applied and the modified audio signals are generated, the modified audio signals can be provided to the speakers of the wearable audio device 102, i.e., first speaker 122 and second speaker 124, to generate an audio playback that tricks the user's mind into thinking they are perceiving sound from an actual externalized source located at the position of the virtual sound sources 146 within environment E. In some examples, the quality of the simulated realism of these modified audio signals can increase by simulating at least first order and/or second order acoustic reflections from virtual sound source 146 within environment E, as well as attenuating or delaying the simulated signal to approximate time-of-flight of propagation of a sound signal through air as though it were originating at the location of the virtual audio source 146 within environment E. It should be appreciated that either wearable audio device 102 and/or peripheral device PD can process, apply, or convolve the HRTFs to simulate the one or more virtual sound sources. However, as the form factor, and therefore space for additional processing components, is typically limited in wearable audio devices, e.g., wearable audio device 102, it should also be appreciated that the application or convolution of the HRTFs with the reference signal 106 discussed is likely to be achieved by circuitry of peripheral device PD and then the modified audio signals can be sent or streamed to wearable audio device 102 to be rendered as audio playback APB. Additional information related to generating and simulating virtual sound sources can be found in United States Patent Application Publication No. 2020/0037097, which application is incorporated herein in its entirety.

Figure 3:
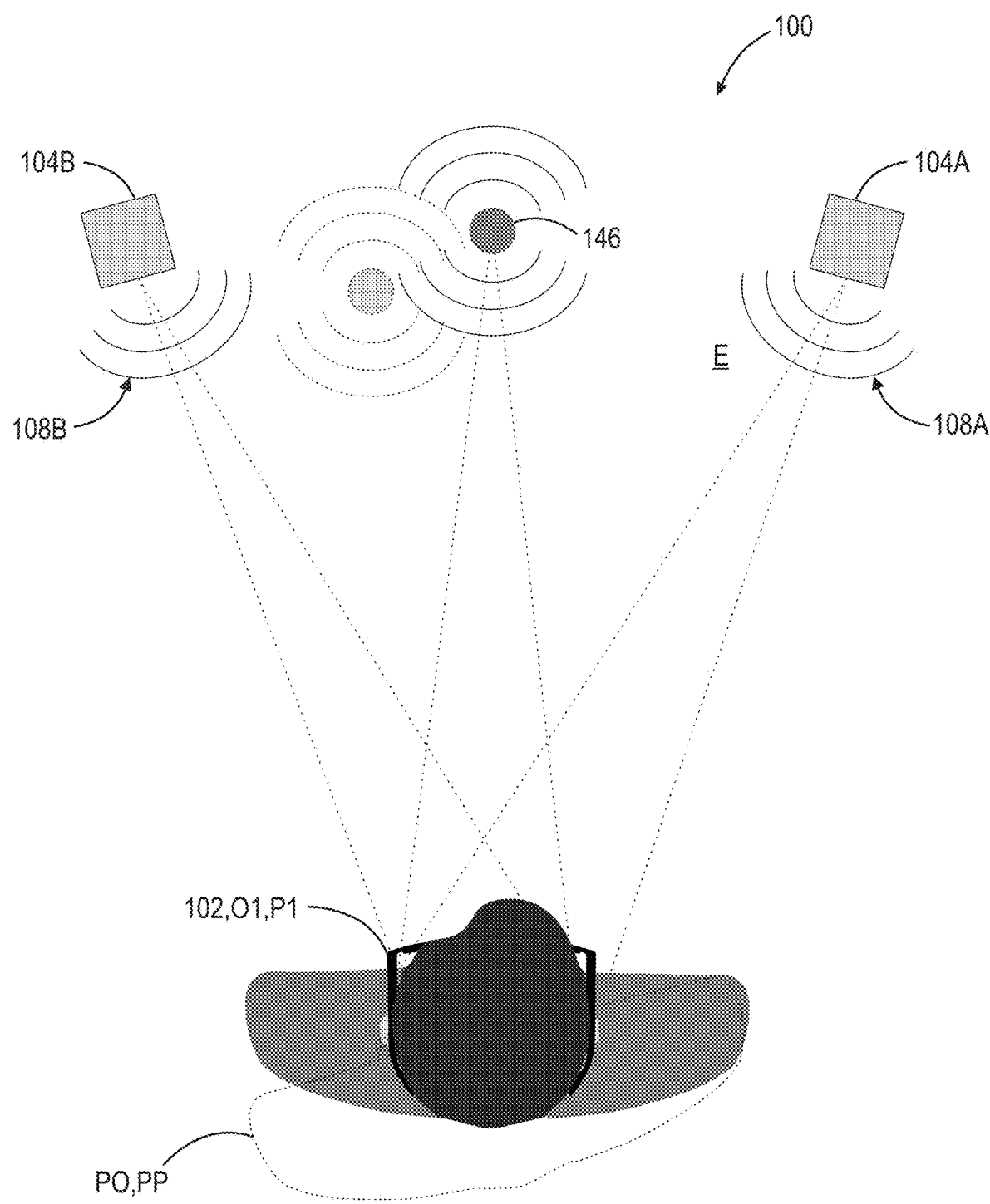
FIG. 3 is a top plan schematic view of a system according to the present disclosure.

During operation, as illustrated in FIG. 3, systems which utilize inertial measurements units, e.g., IMU 130, to obtain position and orientation information of one or more devices, e.g., wearable audio device 102, can experience drift. The term "drift", in addition to its ordinary meaning to those with skill in the art, is intended to mean a quantifiable difference between the perceived orientation PO and/or perceived position PP of the wearable audio device 102 relative to the one or more audio source devices 104 as perceived by the IMU 130, versus, the actual orientation O1, position P1, and height H of the wearable audio device 102 within environment E. Drift can occur for a number of reasons, e.g., drift can be caused by an accumulation of small measurement errors, e.g., due to noise and/or offsets, which compound over time resulting in larger and larger errors in the perceived orientation PO and/or perceived position PP of the wearable audio device 102 with respect to the actual orientation O1 and position P1 of the wearable audio device 102 within environment E. An example illustration of such a drift is represented schematically in FIG. 3. The user's actual orientation O1 and position P1 is illustrated in FIG. 3. Additionally, due to, e.g., an accumulation of errors, the perceived orientation PO, perceived position PP of the wearable audio device 102 is illustrated as a dotted silhouette of the user rotated 15 degrees, and positioned behind the actual user's position. This results in a drift in the location of the virtual audio source 146 (also illustrated in dotted lines in FIG. 3). It should be appreciated that a 15 degree rotational shift and the positional shift illustrated and disclosed herein may be an extreme example, and that other, smaller drift movements are contemplated herein, e.g., rotational drift of 1 degree, 2 degrees, 5 degrees, or larger drift movements, e.g., 20 degrees 30 degrees, and any values between these values. As discussed herein, the present disclosure corrects or adjusts for drift using signals obtained by one or more microphones of the wearable audio device 102 that are representative of the sounds produced by one or more audio source device 104 within the environment E. In other words, the present systems and methods allow for the use of acoustic energy within the environment E to act as beacons such that the wearable audio device 102 can derive its actual orientation O1, position P1 relative to one or more audio source devices 104.

One method of utilizing the sounds produced by the plurality of audio sources 104, i.e., sounds 108A-108C, respectively, is to utilize time-of-flight information 148 (shown in FIG. 2A) of each sound and calculate or derive the orientation O1, position P1, and/or height H of the wearable audio device 102 relative to one or more audio source devices 104. With respect to obtaining position data, this technique may also be referred to as multilateration, e.g., a technique that utilizes times of arrival of energy waves that have known speeds through certain medium, e.g., sound or light through air. In these examples, wearable audio device 102, as well as the audio source devices 104, can know, store, or utilize data obtained from reference signal 106. For example, audio source devices 104A-104C can utilize reference signal 106 to render audible acoustic energy, i.e., sounds 108A-108C, respectively, within environment E. As each audio source device 104 can be at a different position within environment E with respect to wearable audio device 104, the microphone or microphones (e.g., first microphone 126 and/or second microphone 128) of wearable audio device 102 will received the sound waves associated with sounds 108A-108C at different times and generate signals 150A-150F associated with each sound, respectively. By calculating the difference in the time that each sound signal was obtained or received versus the baseline time information from reference signal 106, wearable audio device 102 can determine, calculate, or derive the time-of-flight information 148 for each signal from its respective source to the wearable audio device 102. As sound propagates through air at a known velocity, once the time-of-flight information 148 is known for each signal 150A-150F, the time-of-flight information 148 for each signal can be multiplied by the known velocity of sound through air to obtain the distances between each audio source 104 and the wearable audio device 102. Once the distances between each audio source device 104 and the wearable audio device 102 are known, angles between the wearable audio device 102 and the one or more audio sources 104 can be derived, and the position, orientation, and/or height of the wearable audio device 102 can be derived relative to the audio sources 104. Once these actual values and locations are known, drift, relative to those audio sources, can be corrected and/or prevented.

IMU 130 can utilize an algorithm to determine perceived orientation PO and/or perceived position PP. In one example, the algorithm used by the IMU 130 can be merged with or utilize a gradient descent algorithm or a gradient ascent algorithm to compute the distances between each audio source 104 and wearable audio source 102 and ultimately the actual orientation O1, position P1, and/or height H of the wearable audio device 102 relative to one or more audio source devices 104 using the distance information.

The following is one example implementation of this principle according to the present disclosure. Suppose there are N loudspeakers, e.g., source speakers 144, within an environment E, each producing, generating, or rendering sounds 108. The signal that arrives or is obtained by the $k^{th}$ microphone is:

$$y_k(t) = \sum_{i=1}^{N} g_{ki}(t) * x_i(t - \tau_{ki})$$

In the above equation, $x_i(t)$ denotes the signal played from the $i^{th}$ source speaker 144, $g_{ki}(t)$ represents the transfer function from the $i^{th}$ source speaker 144 to the $k^{th}$ microphone and $\tau_{ki}$d is the corresponding time delay, i.e., the time-of-flight information 148. In one example, the system utilizes a gradient ascent algorithm that adjusts the perceived orientation PO and/or the perceived position PP estimates so that the correlation between the signals obtained by the microphone or microphones and $\hat{Y}_k(t)$ is maximized where $$\hat{Y}_k(t) = \sum_{i=1}^{N} x_i(t - \check{T}_{ki}).$$

In other words, the algorithm finds the time-of-flight information 148 or time shifts $\check{T}_{ki}$ that make the components of the estimated orientation or position, line up in time with those of the signals obtained from the microphone or microphones of the wearable audio device 102.

In the examples that follow, the use of the gradient ascent or gradient descent algorithm allows wearable audio device 102 determine the distances between the respective audio source devices 104 and the wearable audio device 102 as well as the angles between them and the wearable audio device 104 and therefore the positions of the audio sources 104 relative to the wearable audio device 102 are known or can be derived and/or calculated. With the known positions of enough audio sources 104, wearable audio device 102 can triangulate its actual position P1. With additional audio sources, wearable audio device 102 can also derive its height or z-position with respect to the audio sources 104. Furthermore, in example embodiments that utilize more than one microphone, e.g., first microphone 122 and second microphone 124, wearable audio device 102 can also derive, calculate, or otherwise obtain its orientation with respect to the one or more audio source devices 104.

Figure 4:
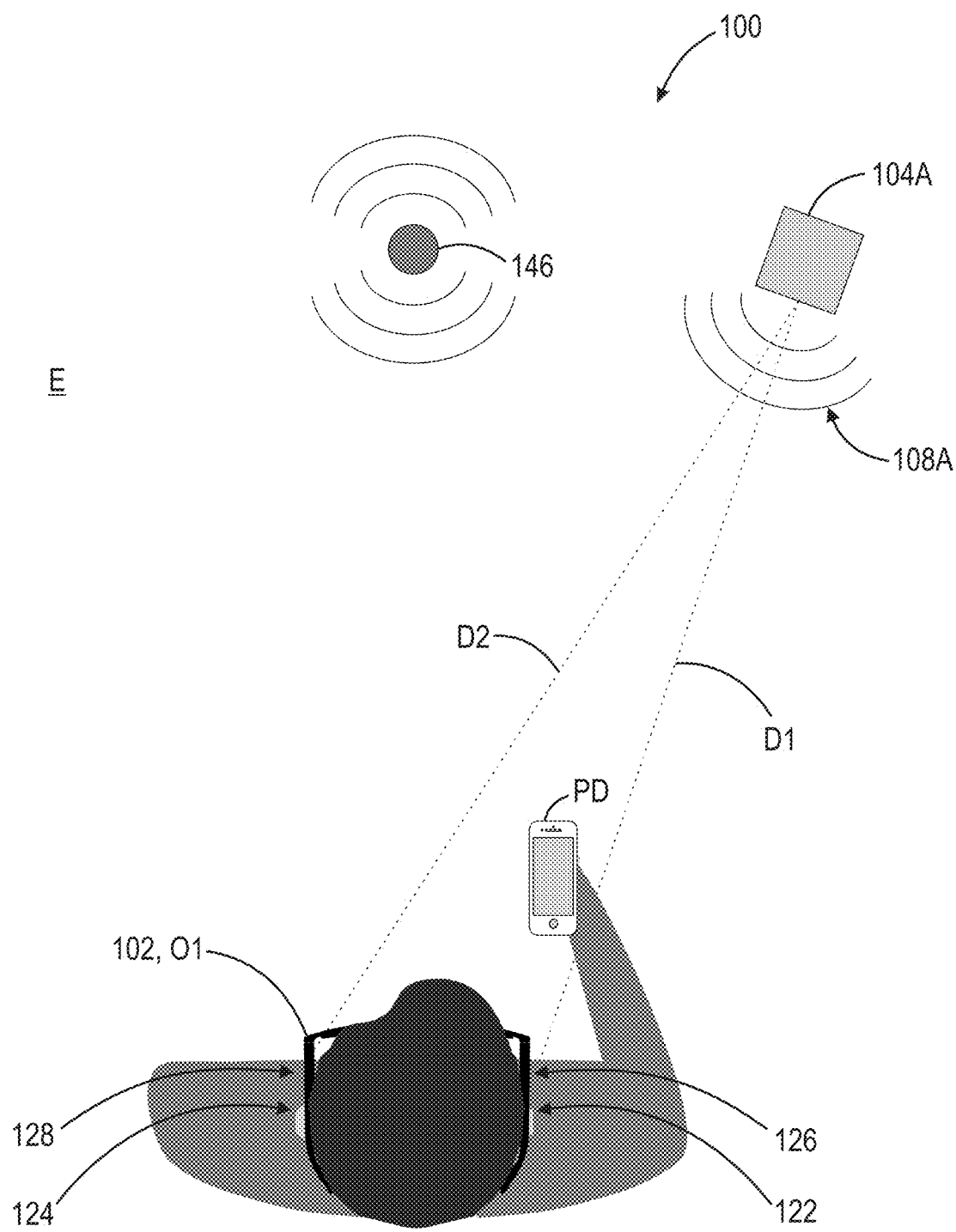
FIG. 4 is a top plan schematic view of a system according to the present disclosure.

In one example operation, as illustrated in FIG. 4, system 100 includes a wearable audio device 102 having two microphones, i.e., first microphone 126 and a second microphone 128, and a single audio source device 104A. Peripheral device PD can send wireless data to source device 104A, e.g., data relating to reference signal 106, so such that audio source 104A can generate, produce, or otherwise render audible acoustic energy within environment E, e.g., sound 108A. Wearable audio device 102 can receive the acoustic energy of sound 108A at first microphone 126 and second microphone 128 and obtain associated signals 150A-150B (shown in FIG. 2A) representative of sound 108A from audio source 104A. As wearable audio device 102 can also receive reference signal 106 from, e.g., peripheral device PD, wearable audio device 102 can compare first signal 150A with reference signal 106 and compare second signal 150B, and obtain time-of-flight information 148 for first signal 150A and second signal 150B. Using time-of-flight information 148 for each signal 150A-150B, and using the known constant velocity of sound propagating through air, wearable audio device 102 can determine, calculate, or otherwise derive (e.g., using a gradient ascent or descent algorithm) the distance between the first microphone 126 and audio source 104A, i.e., first distance D1, as well as the distance between second microphone 128 and audio source 104A, i.e., second distance D2. Once these distances are known, the angle created by distance lines D1 and D2 can be calculated and the actual orientation O1 of wearable audio device 102 relative to audio source 104A can be determined. Additionally, should system 100 generate, or otherwise render one or more virtual audio sources 146, as illustrated, the algorithm employed by IMU 130 can utilize the known orientation O1 of the wearable audio device 102 relative to audio source 104A to correct for any drift in perceived orientation PO of wearable audio device 102 that occurs during operation of system 100 to maintain an accurate orientation and/or position of to the virtual audio source 146. Additionally, it should be appreciated that one or more additional parameters can be assumed to obtain or derive more detailed information related to the position or orientation of wearable audio device, i.e., one or more an assumed parameter 152 (shown in FIG. 2A). For example, it may be assumed that the user is on the surface of the earth and that they are 1.8 meters (roughly 5 ft, 9 inches) tall. Additionally, it may be assumed that the physical speakers, e.g., of audio sources 104A and 104B are positioned 1 meter (roughly 3 ft, 2 inches) above the ground. This may allow the IMU 130 to more accurately determine the distances or angles discussed because the elevation changes between the sources and the wearable audio device that contribute to the distance between the devices can be accounted for.

Additionally, in the example discussed above, i.e., where sound is being received at two microphones (e.g., first microphone 126 and second microphone 128) from a single audio source 104, and only orientation information is desired, it is not necessary to compare the time-of-flight information 148 with reference signal 106, and instead the IMU algorithm can simply determine the actual orientation O1 of the wearable audio device 102 using the time-of-flight information 148 alone.

Figure 5:
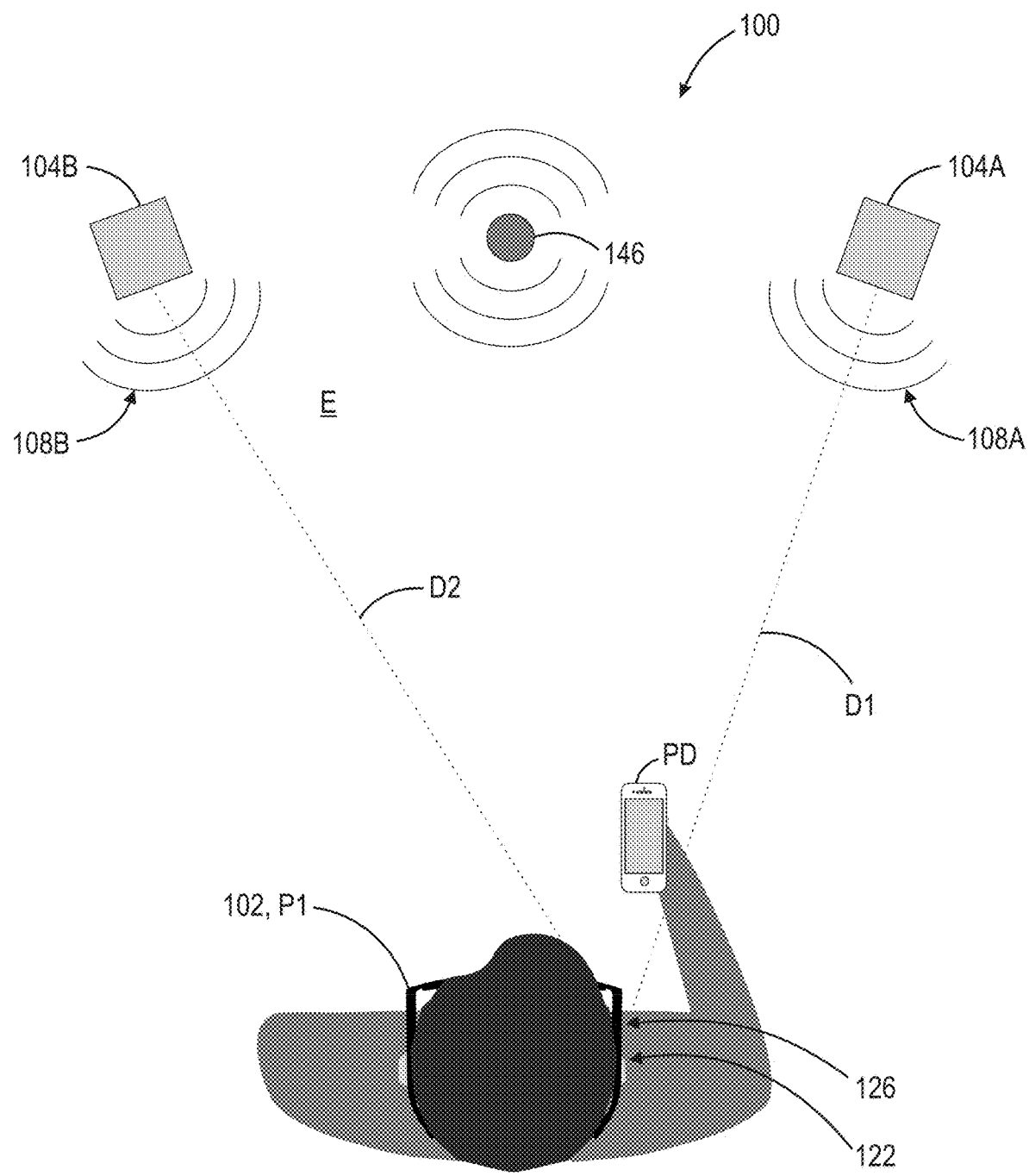
FIG. 5 is a top plan schematic view of a system according to the present disclosure.

In another example operation, as illustrated in FIG. 5, system 100 includes a wearable audio device 102 having a single microphone, i.e., first microphone 126, and two audio source devices 104A and 104B. Although illustrated on the right side of wearable audio device proximate the user's right ear, it should be appreciated that in this example, the single microphone, i.e., first microphone can be positioned anywhere on the wearable audio device. Peripheral device PD can send wireless data to source devices 104A and 104B, e.g., data relating to reference signal 106, so such that audio sources 104A and 104B can generate, produce, or otherwise render audible acoustic energy within environment E, e.g., sounds 108A and 108B, respectively. Wearable audio device 102 can receive the acoustic energy of sounds 108A and 108B at first microphone 126 and obtain associated signals 150A-150B (shown in FIG. 2A) representative of sound 108A and 108B from audio source 104A. As wearable audio device 102 can also receive reference signal 106 from, e.g., peripheral device PD, wearable audio device 102 can compare first signal 150A with reference signal 106 and compare second signal 150B with reference signal 106, and obtain time-of-flight information 148 for first signal 150A and second signal 150B. Using time-of-flight information 148 for each signal 150A-150B, and using the known constant velocity of sound propagating through air, wearable audio device 102 can determine, calculate, or otherwise derive (e.g., using a gradient ascent or descent algorithm) the distance between the first microphone 126 and audio source 104A, i.e., first distance D1, as well as the distance between first microphone 126 and audio source 104B, i.e., second distance D2. Once these distances are known, the angle created by distance lines D1 and D2 can be calculated to a first degree of accuracy (discussed below) and the actual position P1 of wearable audio device 102 relative to audio sources 104A and 104B can be estimated and/or determined. In one example, the first degree of accuracy is a low degree of accuracy, e.g., equal time-of-flight information 148 from both audio sources 104A and 104B can indicate that the wearable audio device 102 is located at any point along the plane created exactly between the two sources, but would not indicate where in that plane the wearable audio device 102 is located.

Additionally, should system 100 generate, or otherwise render one or more virtual audio sources 146, as illustrated, the algorithm employed by IMU 130 can utilize the known position P1 of the wearable audio device 102 relative to audio sources 104A and 104B to correct for any drift in perceived position PP of wearable audio device 102 that occurs during operation of system 100 to maintain an accurate position of to the virtual audio source 146. As will be discussed below, it should be appreciated that one or more additional parameters can be assumed to obtain or derive more detailed information related to the position or orientation of wearable audio device, i.e., one or more an assumed parameter 152. For example, it may be assumed that the user is on the surface of the earth and that they are 1.8 meters (roughly 5 ft, 9 inches) tall. Additionally, it may be assumed that the physical speakers, e.g., of audio sources 104A and 104B are positioned 1 meter (roughly 3 ft, 2 inches) above the ground. This may allow the IMU 130 to more accurately determine the distances or angles discussed because the elevation changes between the sources and the wearable audio devices that contribute to the distance between the devices can be accounted for.

Figure 6:
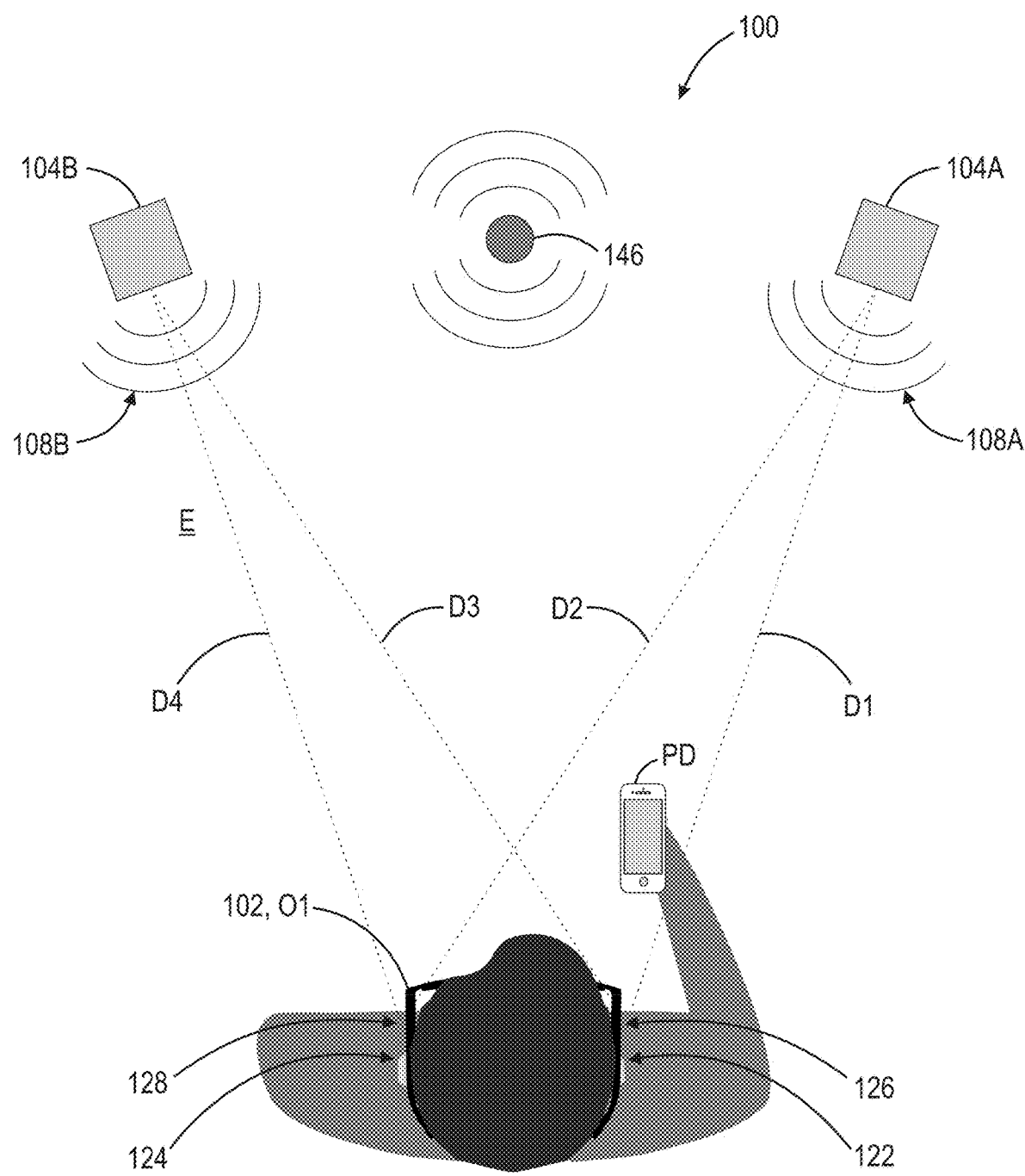
FIG. 6 is a top plan schematic view of a system according to the present disclosure.

In another example operation, as illustrated in FIG. 6, system 100 includes a wearable audio device 102 having two microphones, i.e., first microphone 126 and a second microphone 128, and two audio source devices 104A and 104B. Peripheral device PD can send wireless data to source devices 104A and 104B, e.g., data relating to reference signal 106, so such that audio sources 104A and 104B can generate, produce, or otherwise render audible acoustic energy within environment E, e.g., sounds 108A and 108B. Wearable audio device 102 can receive the acoustic energy of sounds 108A and 108B at first microphone 126 and second microphone 128 and obtain associated signals 150A-150D (shown in FIG. 2A) representative of sound 108A from audio source 104A and sound 108B from audio source 104B at each microphone. As wearable audio device 102 can also receive reference signal 106 from, e.g., peripheral device PD, wearable audio device 102 can compare first signal 150A, second signal 150B, third signal 150C, and fourth signal 150D with reference signal 106 and obtain time-of-flight information 148 for signal 150A-150D. Using time-of-flight information 148 for each signal 150A-150D, and using the known constant velocity of sound propagating through air, wearable audio device 102 can determine, calculate, or otherwise derive (e.g., using a gradient ascent or descent algorithm) the distance between the first microphone 126 and audio source 104A (i.e., first distance D1), the distance between second microphone 128 and audio source 104A (i.e., second distance D2), the distance between first microphone 126 and audio source 104B (i.e., third distance D3), and the distance between second microphone 128 and audio source 104B (i.e., fourth distance D4). Once these distances are known the angle created by distance lines D1 and D2, and D3 and D4 can be calculated and the actual position P1 can be determined to a first degree of accuracy. In one example, the first degree of accuracy is a low degree of accuracy, e.g., equal time-of-flight information 148 from both audio sources 104A and 104B can indicated that the wearable audio device 102 is located at any point along the plane created exactly between the two sources, but would not indicate where in that plane the wearable audio device 102 is located. Additionally, as wearable audio device 102 includes two microphones, e.g., where first microphone 126 and second microphone 128 are positioned on opposing sides of wearable audio device 102, the actual orientation O1 of wearable audio device 102 relative to audio source 104A and audio source 104B can also be determined.

Should system 100 generate, or otherwise render one or more virtual audio sources 146, as illustrated, the algorithm employed by IMU 130 can utilize the known orientation O1 and actual position P1 of the wearable audio device 102 relative to audio sources 104A and 104B to correct for any drift in perceived orientation PO or perceived position PP of wearable audio device 102 that occurs during operation of system 100 to maintain an accurate orientation and/or position of to the virtual audio source 146. As will be discussed below, it should be appreciated that one or more additional parameters can be assumed to obtain or derive more detailed information related to the position, orientation, or height of wearable audio device, i.e., one or more an assumed parameter 152. For example, it may be assumed that the user is on the surface of the earth and that they are 1.8 meters (roughly 5 ft, 9 inches) tall. Additionally, it may be assumed that the physical speakers, e.g., of audio sources 104A and 104B are positioned 1 meter (roughly 3 ft, 2 inches) above the ground. This may allow the IMU 130 to more accurately determine the distances or angles discussed because the elevation changes between the sources and the wearable audio devices that contribute to the distance between the devices can be accounted for.

Figure 7:
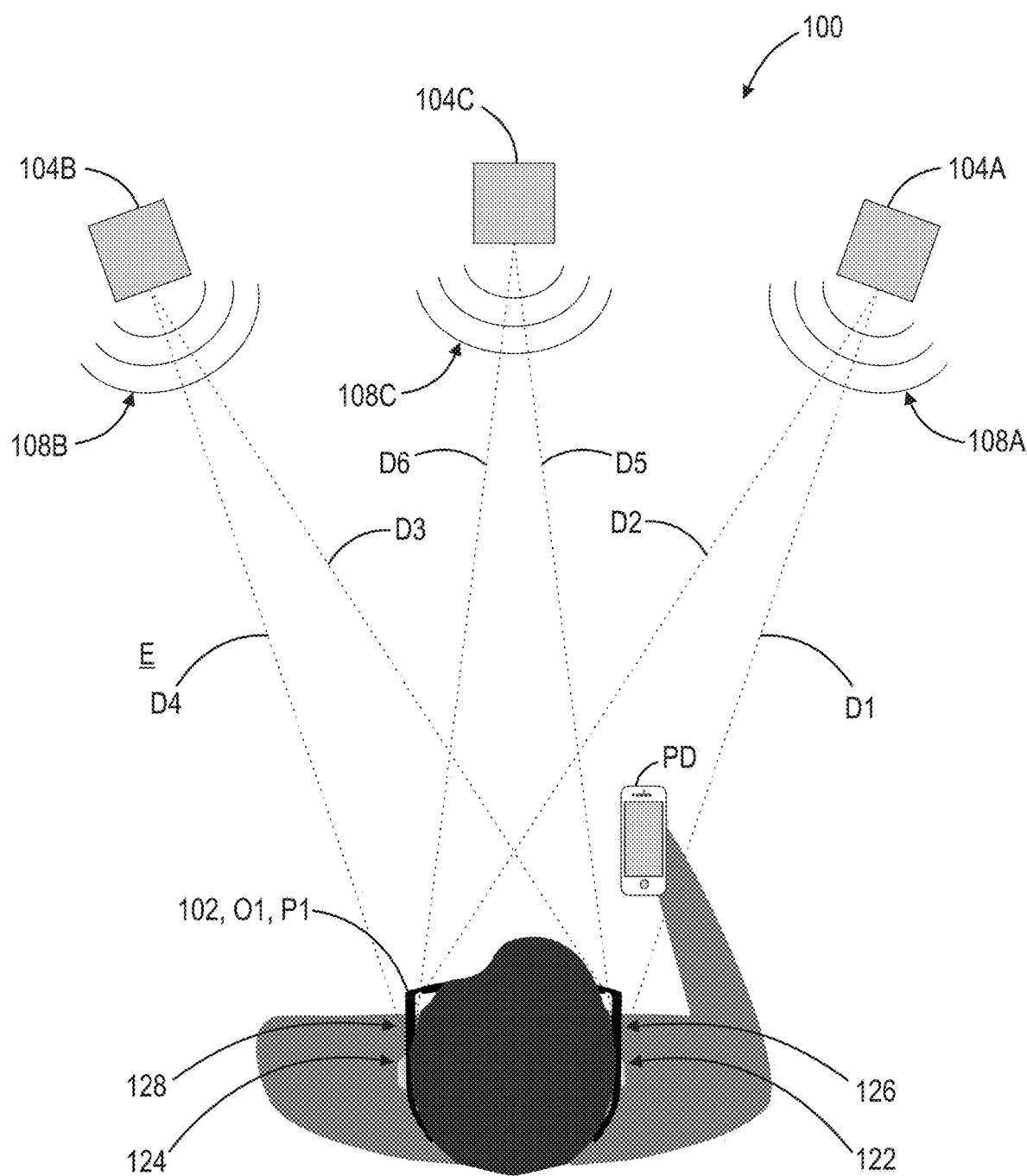
FIG. 7 is a top plan schematic view of a system according to the present disclosure.

In another example operation, as illustrated in FIG. 7, system 100 includes a wearable audio device 102 having two microphones, i.e., first microphone 126 and a second microphone 128, and three audio source devices 104A-104C. Peripheral device PD can send wireless data to source devices 104A-104C, e.g., data relating to reference signal 106, so such that audio sources 104A-104C can generate, produce, or otherwise render audible acoustic energy within environment E, e.g., sounds 108A-108C. Wearable audio device 102 can receive the acoustic energy of sounds 108A-108C at first microphone 126 and second microphone 128 and obtain associated signals 150A-150F (shown in FIG. 2A) representative of sounds 108A-108C at each microphone. As wearable audio device 102 can also receive reference signal 106 from, e.g., peripheral device PD, wearable audio device 102 can compare each signal 150A-105F with reference signal 106 and obtain time-of-flight information 148 for signals 150A-150F. Using time-of-flight information 148 for each signal 150A-150F, and using the known constant velocity of sound propagating through air, wearable audio device 102 can determine, calculate, or otherwise derive (e.g., using a gradient ascent or descent algorithm) the distances between each audio source device 104A-104C and each microphone, e.g., distances D1-D6. Once these distances are known the angle created by distance lines D1 and D2, D3 and D4, and D5 and D6 can be calculated and the actual position P1 can be determined to a second degree of accuracy higher than the first degree of accuracy. In one example, the second degree of accuracy is a high degree of accuracy, e.g., time-of-flight information 148 from all three audio sources 104A-104C can be utilized to triangulate, using multilateration techniques to obtain or derive the actual position P1 of wearable audio device 102. Additionally, as wearable audio device 102 includes two microphones, e.g., where first microphone 126 and second microphone 128 are positioned on opposing sides of wearable audio device 102, the actual orientation O1 of wearable audio device 102 relative to audio source 104A and audio source 104B can also be determined. Moreover, with three or more audio source devices 104, system 100 can potentially derive the actual height H of the wearable audio device 102. With additional sources, e.g., four sources, five sources, or six sources, system 100 can utilize the algorithm and techniques discussed herein to determine its own position and orientation relative to the audio source devices and obtain information related to the six degrees of freedom of the device, e.g., the x, y, and z positions of the device within a cartesian coordinate system, as well as yaw, pitch, and roll.

Should system 100 generate, or otherwise render one or more virtual audio sources 146 (shown in FIGS. 3-6), as illustrated, the algorithm employed by IMU 130 can utilize the known orientation O1 and actual position P1 of the wearable audio device 102 relative to audio sources 104A and 104B to correct for any drift in perceived orientation PO or perceived position PP of wearable audio device 102 that occurs during operation of system 100 to maintain an accurate orientation and/or position of to the virtual audio source 146. As will be discussed below, it should be appreciated that one or more additional parameters can be assumed to obtain or derive more detailed information related to the position, orientation, or height of wearable audio device, i.e., one or more an assumed parameter 152. For example, it may be assumed that the user is on the surface of the earth and that they are roughly 1.8 meters (roughly 5 ft, 9 inches) tall. Additionally, it may be assumed that the physical speakers, e.g., of audio sources 104A and 104B are positioned roughly 1 meter (roughly 3 ft, 2 inches) above the ground. This may allow the IMU 130 to more accurately determine the distances or angles discussed because the elevation changes between the sources and the wearable audio devices that contribute to the distance between the devices can be accounted for.

Figure 8:
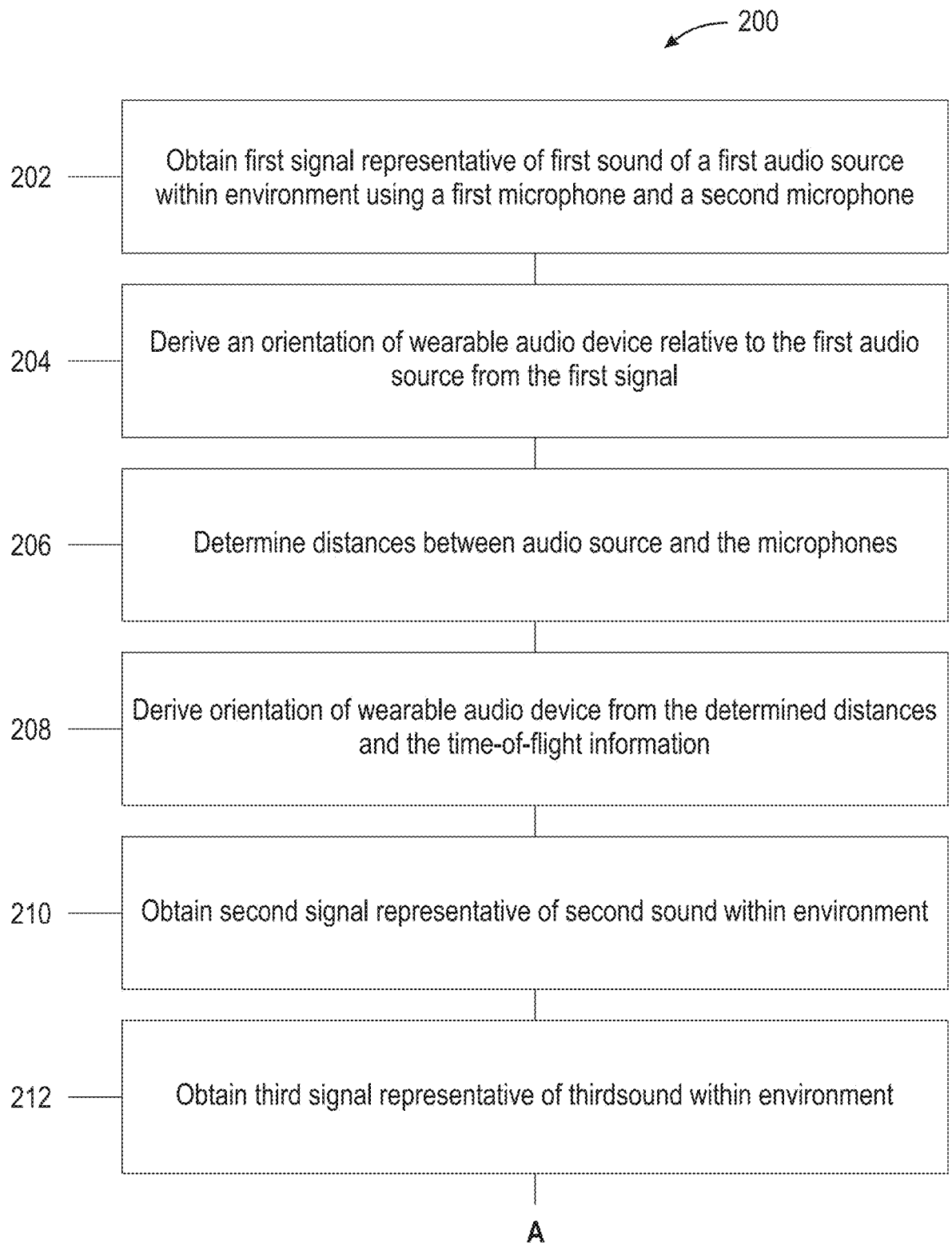
FIG. 8 illustrates the steps of a method according to the present disclosure.
Figure 9:
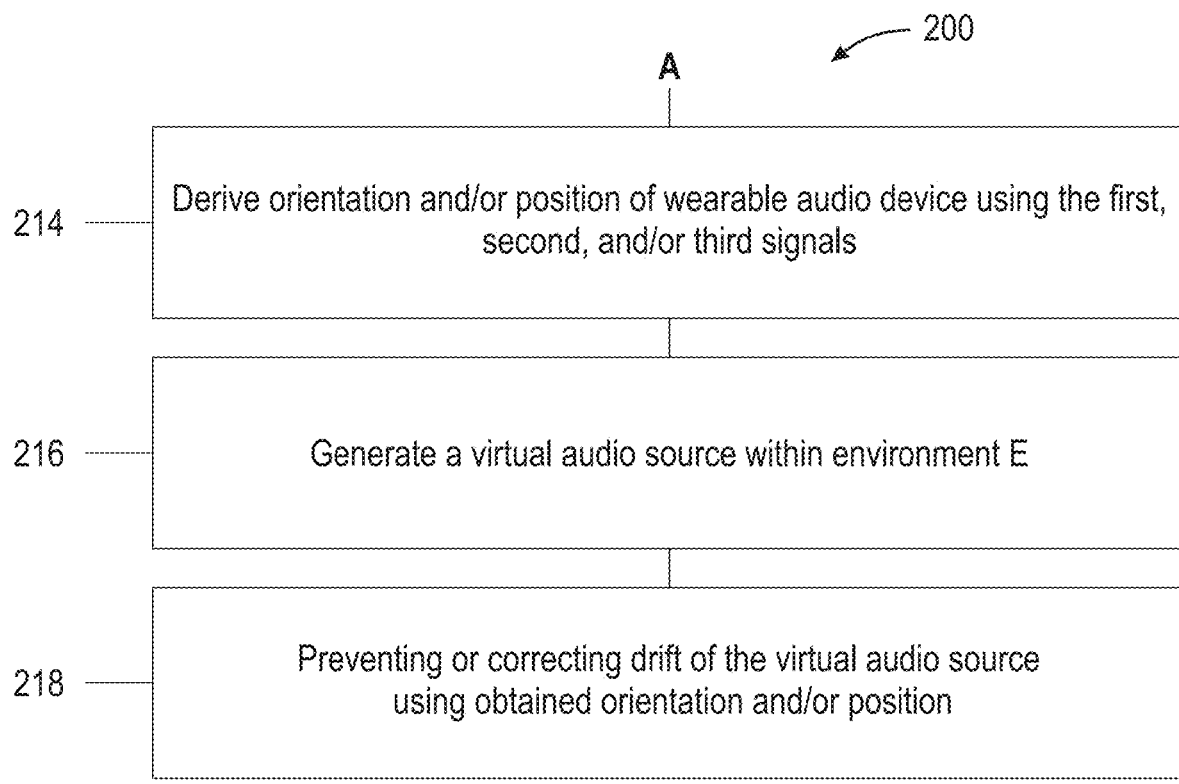
FIG. 9 illustrates the steps of a method according to the present disclosure.

FIGS. 8-9 illustrate an exemplary flow chart showing the steps of method 200 according to the present disclosure. Method 200 includes, for example: obtaining, via a first microphone 126 and a second microphone 128 of a wearable audio device 102, a first signal representative 150A of a first sound 108A rendered in an environment E by a first audio source 104A (step 202); and deriving, via a processor 112, the orientation O1 of the wearable audio device 102 relative to the first audio source 104A within the environment E based on the first signal 150A received at the first microphone 126 and the second microphone 128 (step 204). The determination of orientation can be aided by determining, via the processor 112, a first distance D1 between the first audio source 104A and the first microphone 126 and a second distance D2 between the first audio source 104A and the second microphone 128 based on time-of-flight information 148 (step 206); and deriving the orientation O1 of the wearable audio device 102 relative to the first audio source 104A based at least in part on the time-of-flight information 148 (step 208). Optionally, method 200 can include obtaining, via the first microphone 126 and the second microphone 128, a second signal 150B representative of a second sound 108B rendered within the environment E by a second audio source 104B (step 210); obtaining, via the first microphone 126 and the second microphone 126, a third signal 150C representative of a third sound 108C rendered within the environment by a third audio source 104C (step 212); and deriving, via the processor 112, the orientation O1, position P1, or height H1 of the wearable audio device 102 relative to the first audio source 104A, the second audio source 104B, and/or the third audio source 104C based at least in part on the first signal 150A, the second signal 150B and/or the third signal 150C (step 214).

The method can also include generating, via the processor 112, a first virtual audio source 146 within the environment E (step 216); and preventing or correcting, via the processor, a drift in a virtual position of the first virtual audio source 146 relative to the first audio source 104A, the drift created by the perceived orientation PO of the wearable audio device 102 relative to the first audio source 104A (step 218).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of".

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A wearable audio device comprising:
   a first microphone and a second microphone, the first microphone and the second microphone configured to obtain a first signal representative of a first sound rendered in an environment by a first audio source at a first known location;
   an inertial measurement unit;
   a plurality of speakers; and
   at least one processor configured to derive a first orientation of the wearable audio device relative to the first audio source within the environment based at least in part on the first signal received at the first microphone and the second microphone, wherein the at least one processor is further configured to determine a second orientation of the wearable audio device based at least in part on the inertial measurement unit, wherein the at least one processor is further configured to correct a drift in the second orientation according to the first orientation of the wearable audio device to yield a corrected second orientation, wherein the at least one processor is further configured to generate, using the plurality of speakers, a first virtual audio source within the environment according to the corrected second orientation.

2. The wearable audio device of claim 1, wherein the at least one processor is configured to determine a first distance between the first audio source and the first microphone and a second distance between the first audio source and the second microphone based on time-of-flight information and derive the first orientation of the wearable audio device relative to the first audio source based at least in part on the time-of-flight information.

3. The wearable audio device of claim 1, wherein the first microphone and the second microphone are configured to obtain a second signal representative of a second sound rendered within the environment by a second audio source, and wherein the at least one processor is further configured to derive a position of the wearable audio device relative to the first audio source and the second audio source.

4. The wearable audio device of claim 3, wherein the first microphone and the second microphone are configured to obtain a third signal representative of a third sound rendered within the environment by a third audio source, and wherein the at least one processor is further configured to derive a height of the wearable audio device relative to the first audio source, the second audio source, and/or the third audio source based at least in part on the first signal, the second signal and/or the third signal.

5. The wearable audio device of claim 1, wherein the at least one processor is configured to utilize a gradient descent algorithm or a gradient ascent algorithm which utilizes time-of-flight information from the first signal, a second signal generated by a second audio source, and/or a third signal generated by a third audio source, received at the first microphone and the second microphone, to determine the first orientation and a position of the wearable audio device.

6. A wearable audio device comprising:
   a first microphone configured to obtain a first signal representative of a first sound rendered within an environment by a first audio source at a first known location, and a second signal representative of a second sound rendered within the environment by a second audio source at a second known location;
   an inertial measurement unit;
   a plurality of speakers; and
   at least one processor configured to derive a first position of the wearable audio device relative to the first audio source and the second audio source based at least in part on the first signal and the second signal, wherein the at least one processor is further configured to determine a second position of the wearable audio device based at least in part on the inertial measurement unit, wherein the at least one processor is further configured to correct a drift in the second position according to the position of the wearable audio device to yield a corrected second position, wherein the at least one processor is further configured to generate, using the plurality of speakers, a first virtual audio source within the environment according to the corrected second position.

7. The wearable audio device of claim 6, wherein The at least one processor is configured to determine a first distance between the first audio source and the first microphone and a second distance between the second audio source and the first microphone based on time-of-flight information and derive the first position of the wearable audio device relative to the first audio source and the second audio source based at least in part on the time-of-flight information.

8. The wearable audio device of claim 6, wherein the wearable audio device comprises a second microphone, the second microphone configured to obtain the first signal and the second signal within the environment, and the at least one processor is further configured to derive an orientation of the wearable audio device relative to the first audio source and the second audio source based at least in part on the first signal and the second signal.

9. The wearable audio device of claim 8, wherein the first microphone and the second microphone are configured to obtain a third signal representative of a third sound rendered within the environment by a third audio source, and wherein the at least one processor is further configured to derive a height of the wearable audio device relative to the first audio source, the second audio source, and/or the third audio source based at least in part on the first signal, the second signal and/or the third signal.

10. The wearable audio device of claim 9, wherein The at least one processor is configured to utilize a gradient descent algorithm or a gradient ascent algorithm which utilizes time-of-flight information from the first signal, a second signal generated by a second audio source, and/or the third signal generated by the third audio source, received at the first microphone and the second microphone, to determine the orientation and the first position of the wearable audio device based at least in part on the first signal, the second signal, and/or the third signal.

11. A method of determining an orientation of a wearable audio device, the method comprising:
obtaining, via a first microphone and a second microphone of a wearable audio device, a first signal representative of a first sound rendered in an environment by a first audio source at a first known location;
deriving, via at least one processor, a first orientation of the wearable audio device relative to the first audio source within the environment based on the first signal received at the first microphone and the second microphone;
determining, via the at least one processor, a second orientation of the wearable audio device based at least in part on an inertial measurement unit of the wearable audio device;
correcting, via the at least one processor, a drift in the second orientation according to the first orientation of the wearable audio device to yield a corrected second orientation; and
generating, via the at least one processor and using a plurality of speakers of the wearable audio device, a first virtual audio source within the environment according to the corrected second orientation.

12. The method of claim 11, further comprising:
determining, via the at least one processor, a first distance between the first audio source and the first microphone and a second distance between the first audio source and the second microphone based on time-of-flight information; and
deriving the first orientation of the wearable audio device relative to the first audio source based at least in part on the time-of-flight information.

13. The method of claim 11, further comprising:
obtaining, via the first microphone and the second microphone, a second signal representative of a second sound rendered within the environment by a second audio source in a second known location; and
deriving, via the at least one processor, a position of the wearable audio device relative to the first audio source and the second audio source based at least in part on the first signal and/or the second signal.

14. The method of claim 13, further comprising:
obtaining, via the first microphone and the second microphone, a third signal representative of a third sound rendered within the environment by a third audio source; and
deriving, via the at least one processor, a height of the wearable audio device relative to the first audio source, the second audio source, and/or the third audio source based at least in part on the first signal, the second signal and/or the third signal.

* * * * *